United States Patent [19]

Shirai et al.

[11] Patent Number: 5,009,538
[45] Date of Patent: Apr. 23, 1991

[54] BALL JOINT

[75] Inventors: Tadayoshi Shirai; Masahito Hioki, both of Hamamatsu, Japan

[73] Assignee: Ishikawa Tekko Kabushiki Kaisha, Tokyo, Japan

[21] Appl. No.: 551,912

[22] Filed: Jul. 12, 1990

[30] Foreign Application Priority Data

Aug. 3, 1989 [JP] Japan ................................. 1-201849

[51] Int. Cl.⁵ .............................................. F16C 11/00
[52] U.S. Cl. .................................... 403/134; 403/140; 403/122
[58] Field of Search .................... 403/76, 77, 122, 140, 403/404, 134

[56] References Cited

U.S. PATENT DOCUMENTS 2,791,454  5/1957  Saives ................................. 403/122
3,348,864 10/1967  Ulderup .............................. 403/77
3,833,309  9/1974  Hobbs ................................ 403/122

Primary Examiner—Andrew V. Kundrat
Attorney, Agent, or Firm—Morrison Law Firm

[57] ABSTRACT

A ball joint includes an inner layer of a fiber-reinforced plastic resin and an outer layer of a self-lubricating plastic resin substantially covering the inner layer. A spherical inner chamber in the outer layer slidably holds a ball portion of a ball stud. A stud portion of the ball stud projects from the spherical inner chamber for connection to an external device. A link rod having first and second ball joints at distal ends of a rod portion is also disclosed. The link rod and housings of the first and second ball joints include inner and outer layers as above. In one embodiment, the link rod includes a metallic rod embedded at each end in the plastic resin of rod portions affixed to respective ball joints.

5 Claims, 3 Drawing Sheets

BALL JOINT

BACKGROUND OF THE INVENTION

1. Field of the Invention

The present invention relates to a ball joint.

2. Description of the Prior Art

A link rod is shown in FIG. 4 as an example for which a conventional ball joint is used.

A link rod referred to herein has a rod portion 1 and ball joints 2 provided at both ends thereof. More precisely, the link rod includes a housing 4 made of synthetic resin, having a housing portion 3 integrally formed at each end of rod portion 1. A ball stud 5 is attached to each of housing portions 3 at the ends of housing 4.

In the same manner as in ordinary ball joints, ball joint 2 at each end of a link rod, such as the one described above, includes a ball portion 6 of ball stud 5 pressed into an inner chamber 7 of housing portion 3 where it is slidably supported. A shank portion 8, integrally formed with ball portion 6 of ball stud 5, movably protrudes from the opening of housing portion 3. Naturally, an inner diameter of an opening 9 of housing portion 3 is smaller than the outer diameter of ball portion 6 of ball stud 5 in order to resist a large load when ball portion 6 of ball stud 5 is pulled out of inner chamber 7 of housing 3. The load maximum load before ball portion 6 is withdrawn from housing portion 3 is hereinafter called the breakaway load.

Housing 4, which consists of housing portions 3 and rod portion 1, requires sufficient rigidity and strength to resist compression and/or traction in the direction parallel to rod portion 1. To attain such rigidity and strength, rod portion 1 and housing portions 3 are made sufficiently thick or include reinforcing ribs. Thick sections add weight to the part. Ribs make the part more complicated to mold.

Another way to attain rigidity and strength of housing portions 3 and rod portion 1 is to reinforce the synthetic resin used for molding these portions using reinforcing glass fiber, carbon fiber or other similar material. Such a method, however, reduces the elasticity of the synthetic resin of housing portions 3 due to the presence of the reinforcement fiber. As a result, it is difficult to separate inner chamber 7 of housing portion 3 from the mold at completion of molding. This sometimes damages or breaks housing portion 3. In addition, housing portion 3 is subject to breakage when ball portion 6 of ball stud 5 is pressed into inner chamber 7. Increasing the inner diameter of opening 9 of housing portion 3 in order to solve the above problem undesirably decreases the breakaway load of ball portion 6 of ball stud 5 from housing portion 3.

Another example of a link rod having a ball joint is shown in FIG. 5. This link rod includes a rod 11 having a ring-shaped metal holder 12 integrally formed at each end thereof. A housing 14 of ball joint 13 is supported in each metal holder 12. Housings 14 are made of synthetic resin to permit presssing of a ball portion therin. However, such configuration increases the number of parts, complicates the assembly and increases the cost.

As described above, ball joint 2 that include a housing 4 made of synthetic resin achieves its strength and rigidity at the expense of large size and heavy weight or of complicted assembly. Trying to maintain sufficient strength by reinforcing the synthetic resin with glass fiber, carbon fiber or other similar materials causes reduced breakaway load.

An object of the present invention is to provide a ball joint having a housing made of synthetic resin which consists of a housing portion and a rod portion integrally formed with the outer side of the housing portion, wherein the strength and rigidity of the housing portion and rod portion can be easily attained without reducing the breakaway load of the ball stud or increasing the size or weight.

SUMMARY OF THE INVENTION

Briefly stated, the present invention provides a ball joint including an inner layer of a fiber-reinforced plastic resin and an outer layer of a self-lubricating plastic resin substantially covering the inner layer. A spherical inner chamber in the outer layer slidably holds a ball portion of a ball stud. A stud portion of the ball stud projects from the spherical inner chamber for connection to an external device. A link rod having first and second ball joints at distal ends of a rod portion is also disclosed. The link rod and housings of the first and second ball joints include inner and outer layers as above. In one embodiment, the link rod includes a metallic rod embedded at each end in the plastic resin of rod portions affixed to respective ball joints.

According to an embodiment of the invention, there is provided a ball joint comprising: a housing portion, the housing portion including an inner layer and an outer layer, the inner layer including a fiber-reinforced plastic resin, the outer layer substantially covering the inner layer, the outer layer being a self-lubricating plastic resin substantially without fiber reinforcement, a spherical inner chamber in the outer layer, an opening in the spherical inner chamber, a ball stud, a ball portion of the ball stud slidably mounted in the spherical inner chamber, and a stud portion of the ball stud protruding from the opening.

According to a feature of the invention, there is provided a link rod comprising: a rod portion, a first ball joint integrally formed at a first end of the rod portion, a second ball joint integrally formed at a second end of the rod portion, each of the first and second ball joints including a housing portion, the rod portion and the first and second housing portions including an inner layer and an outer layer, the outer layer substantially covering the inner layer, the inner layer being a fiber-reinforced plastic resin, the outer layer being a self-lubricating plastic resin containing substantially no fiber reinforcement, a first spherical inner chamber in the outer layer on the first ball joint, a second spherical inner chamber in the outer layer on the second ball joint, first and second ball studs, the first ball stud including a first ball portion fitted in the first spherical inner chamber, the first ball stud including a first stud portion projecting from the first spherical inner chamber, the second ball stud including a second ball portion fitted in the second spherical inner chamber, and the second ball stud including a second stud portion projecting from the second spherical inner chamber.

The above, and other objects, features and advantages of the present invention will become apparent from the following description read in conjunction with the accompanying drawings, in which like reference numerals designate the same elements.

DSETAILED DESCRIPTION OF PREFERRED EMBODIMENTS

Figure 1:
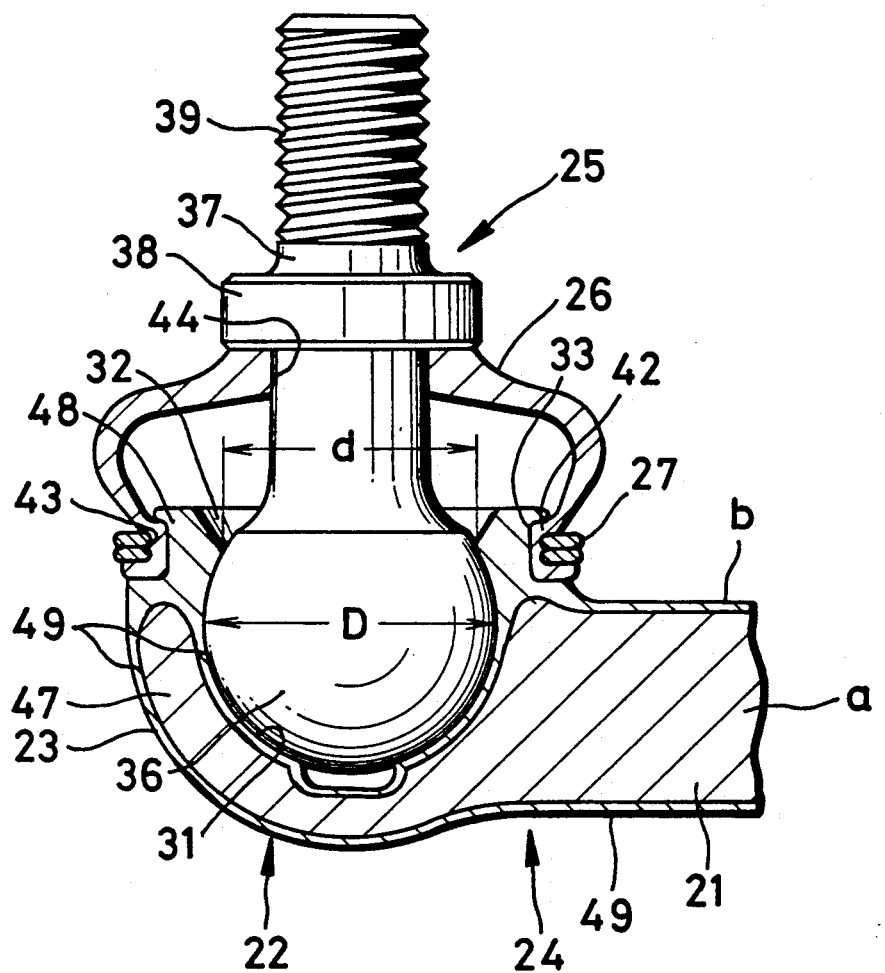
FIG. 1 is a partial sectional view of a link rod of a ball joint according to a first embodiment of the present invention.

Embodiments of the present invention will be described hereunder, referring the attached drawings:

FIG. 1 concerns the first embodiment of the present invention, showing a part of a link rod having a ball joint according to the present invention.

The link rod consists of rod portion 21 with a ball joint 22 at each end thereof. A housing 24 includes a housing portion 23 integrally formed at each end of rod portion 21. A ball stud 25 is fitted in each housing portion 23. A dust cover 26 is fitted over housing 24 and is clamped in place by a clamping ring 27.

Housing portion 23 has a two-layer configuration including an inner layer a of fiber reinforced synthetic resin and an outer layer b of synthetic resin, both of which will be described hereunder. A spherical inner chamber 31 in outer layer b includes a circular opening 32 at the upper part thereof leading to the exterior of housing portion 23. A fitting groove 33 around opening 32 accommodates an affixing portion 42 of dust cover 26 therein. Clamping ring 27 secures affixing portion 42 in place.

Ball stud 25, made of metal, has a spherical ball portion 36 integrally formed at one end thereof. A shank portion 37 includes a flange-like portion 38 around its middle part. An external thread 39 is formed on the upper part of shank portion 37 for connecting to an external member of the machine or object with which the present ball joint is used.

Ball portion 36 of ball stud 25 is pressed into inner chamber 31 of housing portion 23, so a to be free to slide in all directions. Shank portion 37, protruding from opening 32 of housing portion 23, is free to move supported by ball portion 36.

Dust cover 26 is generally bell shaped and made of a suitable flexible material, such as, for example rubber or an elastomer. Ridge-like affixing portion 42 is formed around the inner surface of the large-diameter end thereof to engage into fitting groove 33 of housing portion 23. A clamping groove 43 is formed around the outer surface of affixing portion 42 for attaching clamping ring 27.

A circular opening 44 is disposed at the small-diameter end of dust cover 26.

Dust cover 26, with its affixing portion 42 fitted in fitting groove 33 of housing portion 23 and opening 44 fitted around the outer surface of shank portion 37 of ball stud 25 and stopped by flange 38 of shank portion 37, covers inner chamber 31 and opening 32 of housing portion 23 and ball portion 36 of ball stud 25 to protect them from the entry of dirt or moisture. Shank portion 37 of ball stud 25 protrudes from opening 44 of the dust cover.

The clamping ring 27 is made of wire or flat-shaped steel spring coiled into a ring with at least two turns. An outer diameter of clamping ring 27 is smaller than the diameter of clamping groove 43 of dust cover 26.

Clamping ring 27 is expanded to enlarge its diameter and then fitted into clamping groove 43 of dust cover 26, which is already fitted in fitting groove 33 of housing portion 23. Clamping ring 27 is then allowed to contract whereby its diameter becomes smaller and thereby fastens affixing portion 42 of dust cover 26 in fitting groove 33 of housing portion 23.

Housing portion 23, together with rod portion 21 integrally formed at the outer side thereof, comprises housing 24. Housing 24 has a two-layer structure. The inner layer a consists of fiber reinforced synthetic resin, which is, for example, polyacetal or polyamide synthetic resin reinforced with glass fiber, carbon fiber, etc. The outer layer b is a synthetic resin, without reinforcement in order to take advantage of its characteristics such as appropriate elasticity. Hemispherical core 47 of housing portion 23, located opposite opening 32, and rod portion 21, both of which require rigidity and strength, are integrally formed with fiber reinforced synthetic resin as part of inner layer a. An annular portion 48 around opening 32 of housing portion 23 and an outer layer 49 covering internal and external surfaces of core 47 and rod portion 21, are formed as part of outer layer b with unreinforced synthetic resin, because annular portion 48 and outer layer 49 both require self-lubricity and elasticity.

The core 47, made of fiber reinforced synthetic resin a, is disposed in the area where it is possible, without damaging opening 32 of housing portion 23, to separate inner chamber 31 of housing portion 23 from the mold on completion of molding. Also the resilience of outer layer 47 permits pressing ball portion 36 of ball stud 25 into spherical inner chamber 31 to attain maximum breakaway load.

Core 47, being made of fiber reinforced synthetic resin a, is formed either with a virtually uniform thickness from the bottom of inner chamber 31 of housing portion 23 to the equatorial part or, following the uniformly thich part from the bottom of inner chamber 31 of housing portion 23 to the equatorial part, with a gradually increased thickness from the equatorial part towards opening 32 in order to maintain the elasticity of opening 32. Such elasticity is necessary to permit separation of inner chamber 31 of housing portion 23 from the mold on completion of molding housing 24 as well as for pressing ball portion 36 of ball stud 25 therein.

The reason for the above formation is that using fiber reinforced synthetic resin a at an area near opening 32 would make separation of the mold and/or insertion of ball portion 36 of ball stud 25 with pressure difficult due to fiber reinforced synthetic resin as characteristically high rigidity.

If an inner layer a of fiber reinforced synthetic resin is not used, or, if is used in a thin layer, near opening 32, it is not necessary to make the inner diameter of opening 32 particularly large and it thus is possible to make opening 32 about the same size as that of a conventional housing uniformly made of one kind of synthetic resin.

More precisely, the most desirable relative magnitude between inner diameter $d$ of opening 32 of housing portion 23 and inner diameter $D$ of the equatorial part of inner chamber 31 is approximately in the range of $a = 0.05 \sim 0.10$ when $(D-d)/D = a$.

In cases where $a$ is more than 0.10, removal of inner chamber 31 of housing portion 23 from the mold is difficult, thus threatening deformation and/or breakage of housing portion 23. On the other hand, in case of $a$ being less than 0.05, although there is no danger of deformation or breakage of housing portion 23, this condition decreases the breakaway load at which ball portion 36 of ball stud 25 slips out of opening 32 of housing portion 23.

Further, housing 24 is easily formed using a sandwich molding device made by Battenfeld GmbH of Federal Republic of Germany or other similar device.

Figure 2:
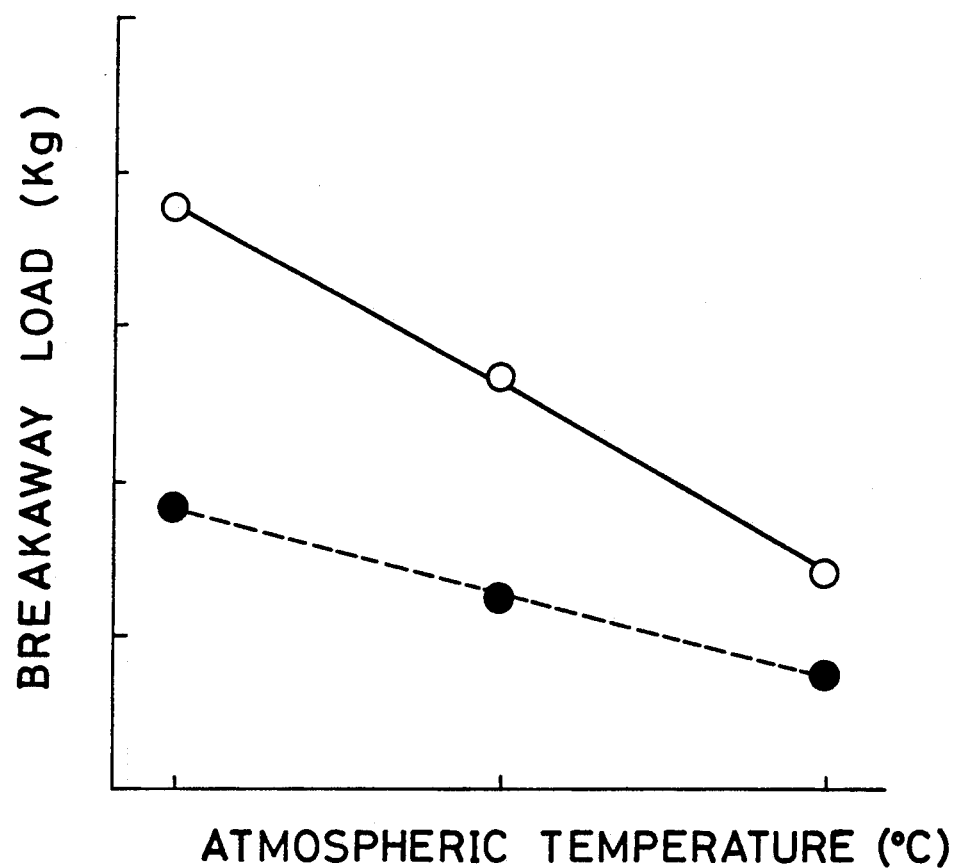
FIG. 2 is a comparison diagram of the static strength versus contraction force between a ball joint according to the present invention shown in FIG. 1 and a conventional ball joint shown in FIG. 4.
Figure 4:
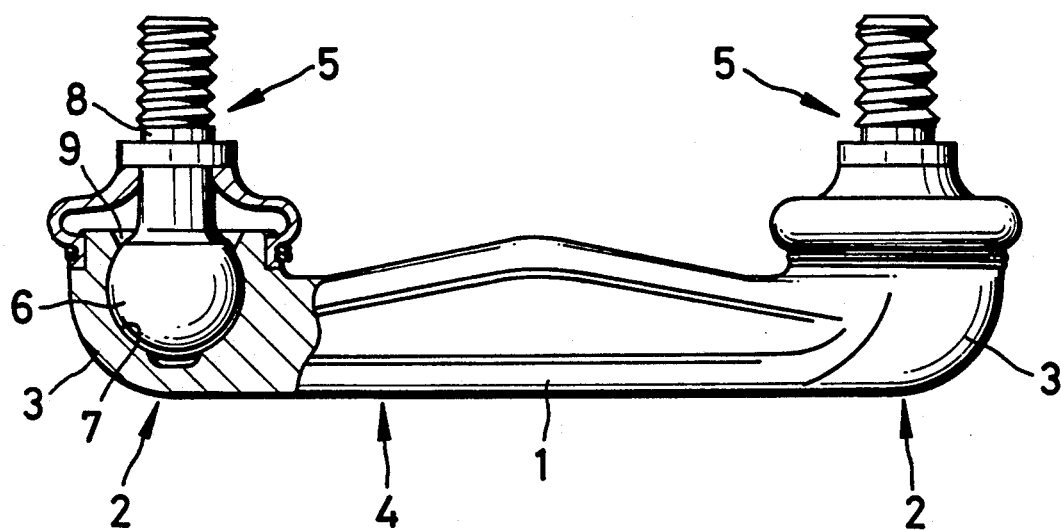
FIG. 4 and FIG. 5 are partial sectional views of link rods respectively having conventional ball joints.
Figure 5:
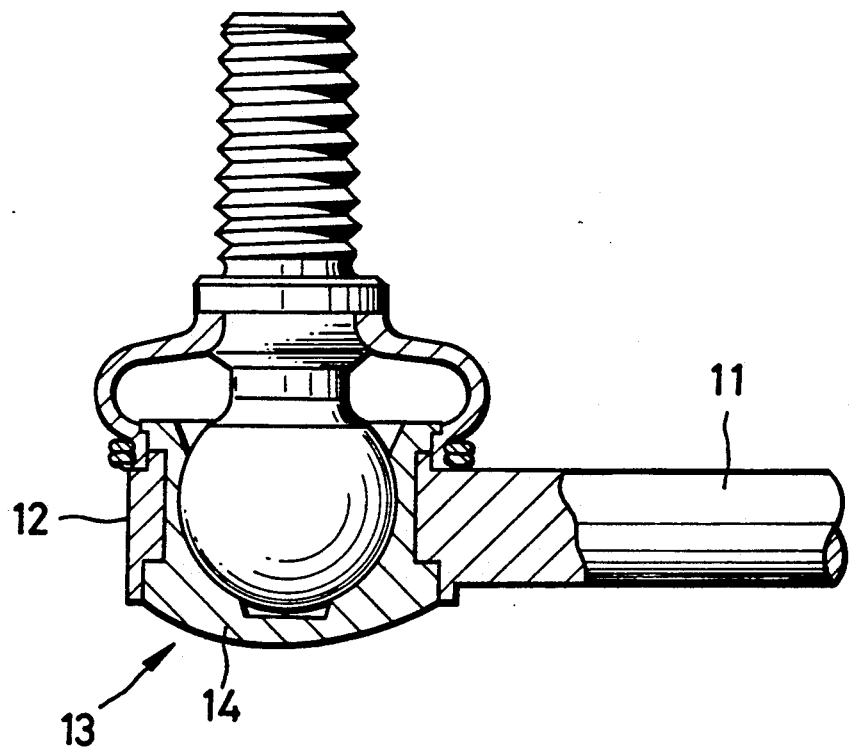

FIG. 2 shows the difference in breakaway load between a link rod according to the present invention shown in FIG. 1 (open circle) and a conventional link rod shown in FIG. 4 (filled circles). These results were obtained in a static strength test against a contacting force. FIG. 2 shows that the breakaway load for ball joint portion 22 of the link rod of the present invention, shown in the continuous line, is nearly twice as great as that of a conventional link rod, which is shown in short dashed line.

Figure 3:
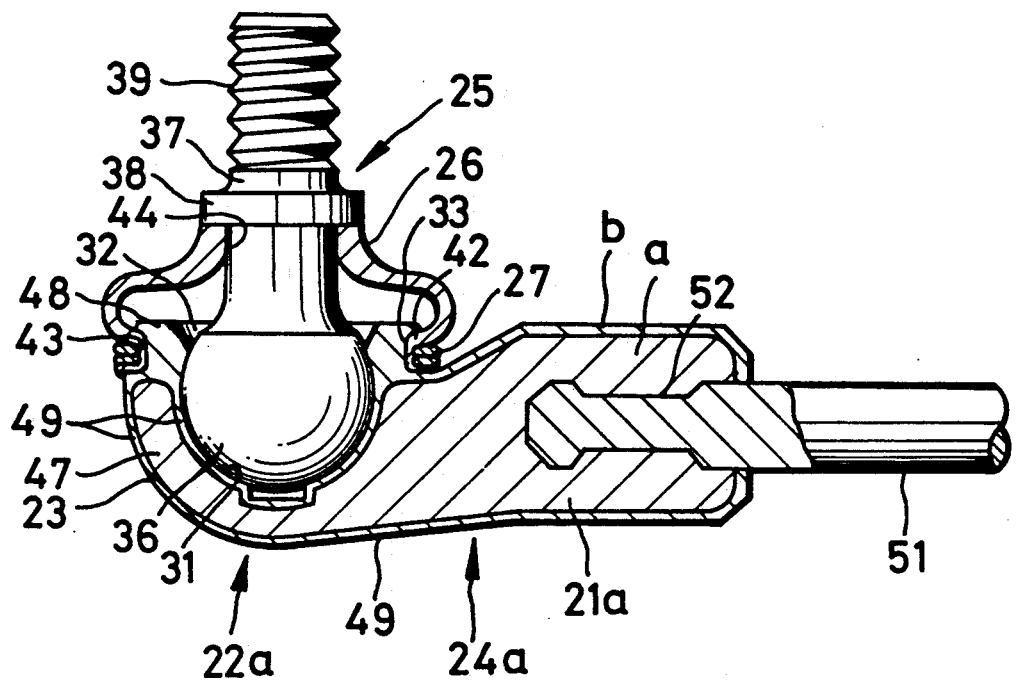
FIG. 3 is a partial sectional view of a link rod of a ball joint according to a second embodiment of the present invention.

FIG. 3 concerns another embodiment of a ball joint according to the present invention, showing a part of a link rod provided with a ball joint according to the present invention.

This second embodiment has nearly the same configuration as that of the first embodiment described above, except that it is an insert type link rod employing a pair of ball joints 22a connected to a rod 51 made of metal.

According to the second embodiment, housing 24a of ball joint 22a has a short rod portion 21a integrally formed with housing portion 23. An end of rod 51 is embedded in rod portion 21a.

A slip preventing portion 52 of rod 51 is buried in rod portion 21a. The slip preventing portion 52 has an external shape different from that of the other part thereof in order to prevent rod 51 from slipping out of rod portion 21a.

If housing 24a locked the two-layer structure of fiber reinforced synthetic resin a and synthetic resin b, rod portion 21a being exclusively of synthetic resin b, there would be a problem of reduced breakaway load. In the present invention however, rod portion 21a and housing portion 23 have a two-layer structure of fiber reinforced synthetic resin a and synthetic resin b, with rod portion 21a being integrally formed with core 47 of housing portion 23 made of fiber reinforced synthetic resin a. As a result, rod portion 21a has high rigidity and strength, and the breakaway load of ball portion 36 from rod portion 21a is improved. In addition, the torsional strength and the breaking load of the connecting part of rod portion 21a and rod 51 are also improved.

Both embodiments described above present link rods with their respective rod portion 21 or rod 51 having a ball joints 22 or 22a at each end thereof. One skilled in the art will recognize that the present invention is not limited to link rods as above but is equally applicable to a single ball joint.

As described as above, a ball joint 22, 22a according to the present invention provides enhanced strength and rigidity of the housing portion 23 due to the presence of a core 47 made of fiber reinforced synthetic resin a rod portion 21, 21a. This makes it unnecessary to increase the size or weight of the ball joint 22, 22a. Since it is possible to maintain the elasticity of the annular portion 48 around the opening 32 because of the un-reinforced synthetic resin in that region, it is unnecessary to increase the inner diameter of the opening 32 large. This maintains the breakaway load of the ball stud 25. Furthermore, because of the self-lubricating properties of the outer layer made of the synthetic resin b, a stable sliding torque of the ball portion 36 of the ball stud is maintained for a long period of time.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball joint comprising:
   a housing portion;
   said housing portion including an inner layer and an outer layer;
   said inner layer including a fiber-reinforced plastic resin;
   said outer layer substantially covering said inner layer;
   said outer layer being a self-lubricating plastic resin substantially without fiber reinforcement;
   a spherical inner chamber in said outer layer;
   a hemi-spherical inner chamber in said inner layer;
   an opening in said spherical inner chamber;
   a ball stud;
   a ball portion of said ball stud slidably mounted in said spherical inner chamber; and
   a stud portion of said ball stud protruding from said opening.

2. A ball joint comprising:
   a housing portion;
   said housing portion including an inner layer and an outer layer;
   said inner layer including a fiber-reinforced plastic resin;
   said outer layer substantially covering said inner layer;
   said outer layer being a self-lubricating plastic resin substantially without fiber reinforcement;
   a spherical inner chamber in said outer layer;
   an opening in said spherical inner chamber;
   a ball stud;
   a ball portion of said ball stud slidably mounted in said spherical inner chamber;
   a stud portion of said ball stud protruding from said opening;
   a resilient dust cover;
   said resilient dust cover including an affixing portion;
   a fitting groove in said outer layer;
   said affixing portion fitting into said fitting groove;
   means for clamping said affixing portion in said fitting groove;
   a circular opening in said dust cover; and
   said stud portion passing sealingly through said circular opening.

3. A link rod comprising:
   a rod portion;
   a first ball joint integrally formed at a first end of said rod portion;
   a second ball joint integrally formed at a second end of said rod portion;
   each of said first and second ball joints including a housing portion;

said rod portion and said first and second housing portions including an inner layer and an outer layer;

said outer layer substantially covering said inner layer;

said inner layer being a fiber-reinforced plastic resin;

said outer layer being a self-lubricating plastic resin containing substantially no fiber reinforcement;

a first spherical inner chamber in said outer layer on said first ball joint;

a second spherical inner chamber in said outer layer on said second ball joint;

first and second ball studs;

said first ball stud including a first ball portion fitted in said first spherical inner chamber;

said first ball stud including a first stud portion projecting from said first spherical inner chamber;

said second ball stud including a second ball portion fitted in said second spherical inner chamber; and said second ball stud including a second stud portion projecting from said second spherical inner chamber.

4. A link rod according to claim 3, wherein:

said rod portion includes a first rod portion integrally formed with said first ball joint and a second rod portion integrally formed with said second ball joint;

said first and second rod portions being spaced apart;

a metallic rod having first and second ends;

said first end being embedded in said first rod portion;

said second end being embedded in said second rod portion, whereby said first and second rod portions are joined together.

5. A link rod according to claim 4, wherein:

said first and second ends each includes a slip preventing portion;

each of said slip preventing portions including an external shape that is different from a remainder of said metallic rod, whereby withdrawal of said first and second ends from their respective rod portions is resisted.

* * * * *